(12) United States Patent
Fort et al.

(10) Patent No.: US 10,353,956 B2
(45) Date of Patent: Jul. 16, 2019

(54) IDENTIFYING MERCHANT DATA ASSOCIATED WITH MULTIPLE DATA STRUCTURES

(71) Applicant: Capital One Services, LLC, McLean, VA (US)

(72) Inventors: Pavel Fort, Westbury, NY (US); Ashish Bansal, San Ramon, CA (US); Chang W. Kim, Wyckoff, NJ (US); John E. Schlerf, Oakland, CA (US); Philip Spiegel, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/796,156

(22) Filed: Oct. 27, 2017

(65) Prior Publication Data
US 2019/0121918 A1 Apr. 25, 2019

Related U.S. Application Data

(60) Provisional application No. 62/574,652, filed on Oct. 19, 2017.

(51) Int. Cl.
| | | |
|---|---|---|
| *G06F 16/903* | (2019.01) | |
| *G06Q 10/10* | (2012.01) | |
| *G06N 5/02* | (2006.01) | |
| *G06N 20/00* | (2019.01) | |
| *G06F 16/2455* | (2019.01) | |

(52) U.S. Cl.
CPC .. *G06F 16/90335* (2019.01); *G06F 16/24564* (2019.01); *G06N 5/022* (2013.01); *G06N 20/00* (2019.01); *G06Q 10/10* (2013.01)

(58) Field of Classification Search
CPC combination set(s) only.
See application file for complete search history.

(56) References Cited

U.S. PATENT DOCUMENTS

| 8,448,111 B2* | 5/2013 | Mneimneh | G06F 17/5045 |
| | | | 716/108 |
| 8,775,880 B2* | 7/2014 | Singh | G11C 29/4401 |
| | | | 714/710 |

(Continued)

OTHER PUBLICATIONS

MPOE Prefiltering with Statistical Channel Model for DS-CDMA Systems G. Kannan; M. Garg; S. N. Merchant; U. B. Desai 2007 IEEE International Conference on Communications Year: 2007 pp. 2822-2828 IEEE Conferences.*

(Continued)

*Primary Examiner* — Michael B Holmes
(74) *Attorney, Agent, or Firm* — Harrity & Harrity, LLP

(57) ABSTRACT

A device may receive a merchant query including first merchant data associated with a first merchant. The first merchant data may be provided, as input, to a merchant matching model associated with a merchant data structure, the merchant matching model having been trained to determine a measure of confidence that input merchant data corresponds to an existing merchant in the merchant data structure. The device may receive, as output from the merchant matching model, a measure of confidence that the first merchant data corresponds to a second merchant, the second merchant being associated with second merchant data stored in the merchant data structure. The device may also determine, based on the measure of confidence, that the first merchant corresponds to the second merchant. Based on the determination, the device may obtain the second merchant data from the merchant data structure and perform an action based on the second merchant data.

20 Claims, 5 Drawing Sheets

(56) References Cited

U.S. PATENT DOCUMENTS

| | | | | |
|---|---|---|---|---|
| 8,856,706 | B2* | 10/2014 | Mneimneh | G06F 17/5045 716/108 |
| 9,082,619 | B2* | 7/2015 | Kapur | H01L 21/02568 |
| 9,602,949 | B2 | 3/2017 | Wetzel et al. | |
| 9,923,772 | B2* | 3/2018 | Bansal | H04L 41/0893 |
| 9,924,382 | B2* | 3/2018 | Bansal | H04W 28/085 |
| 2010/0205079 | A1 | 8/2010 | Ferguson et al. | |
| 2011/0265172 | A1 | 10/2011 | Sharma et al. | |
| 2012/0297451 | A1 | 11/2012 | Ozzie | |
| 2013/0054803 | A1 | 2/2013 | Shepard et al. | |
| 2013/0109348 | A1 | 5/2013 | Sharma et al. | |
| 2014/0259135 | A1 | 9/2014 | Postrel | |
| 2014/0289118 | A1 | 9/2014 | Kassemi et al. | |
| 2015/0052036 | A1 | 2/2015 | Vernal et al. | |
| 2015/0052061 | A1 | 2/2015 | Anderson et al. | |
| 2016/0142873 | A1 | 5/2016 | Trivedi et al. | |
| 2017/0180343 | A1 | 6/2017 | de Ganon et al. | |

OTHER PUBLICATIONS

Minimum Probability of Error Based Prefiltering for DS-CDMA Systems Mohit Garg; G. Kannan; S. N. Merchant; U. B. Desai 2006 IEEE Mountain Workshop on Adaptive and Learning Systems Year: 2006 pp. 116-121 IEEE Conferences.*

Star Quality: Aggregating Reviews to Rank Products and Merchants Mary McGlohon*†, Natalie Glance†, Zach Reiter† mmcgloho@cs.cmu.edu, nglance@google.com, zachreiter@google.com †Google, Inc, Pittsburgh PA * Carnegie Mellon University, Pittsburgh PA 2010, Association for the Advancement of Artificial Intelligence (www.aaai.org).*

Merchant Reputation on Consumer Decisions to Shop OnlineTwenty-second Americas Conference on Information Systems, San Diego, 2016 The Influence of Merchant Reputation on Consumer Decisions to Shop Online Chin Eang Ong RMIT University, Australia chineang.ong@rmit.edu.au Caroline Chan RMIT University, Australia caroline.chan@rmit.edu.au.*

ACM Digital Library Minerva: An automated resource provisioning tool for large-scale storage systems Guillermo A. Alvarez et al., Published in: Journal ACM Transactions on Computer Systems (TOCS) TOCS vol. 19 Issue 4, Nov. 2001 pp. 483-518.*

ACM Digital Library A vision for management of complex models Phillip A. Bernstein, Alon Y. Halevy, Alon Y. Halevy Published in:Newsletter ACM SIGMOD Record vol. 29 Issue 4, Dec. 20000 pp. 55-63.*

* cited by examiner

IDENTIFYING MERCHANT DATA ASSOCIATED WITH MULTIPLE DATA STRUCTURES

CROSS-REFERENCE TO RELATED APPLICATION

This application claims priority under 35 U.S.C. § 119 to U.S. Provisional Patent Application No. 62/574,652, filed on Oct. 19, 2017, the content of which is incorporated by reference herein in its entirety.

BACKGROUND

Computing devices are capable of storing a significant volume of data regarding a variety of entities and topics in a variety of ways. Merchant data, for example, is one type of data that might be stored by a variety of different organizations and may be used in a variety of ways. Merchant data can include, for example, information associated with who the merchant is, what goods or services the merchant provides, where the merchant is located, merchant history, merchant sales data, or the like. Merchant data may be used for a variety of purposes, such as data analytics, information retrieval, and/or market research, to name a few.

SUMMARY

According to some implementations, a device may include one or more processors to receive a merchant query including first merchant data associated with a first merchant; provide the first merchant data as input to a merchant matching model associated with a merchant data structure, the merchant matching model having been trained to determine a measure of confidence that input merchant data corresponds to an existing merchant in the merchant data structure; receive, as output from the merchant matching model, a measure of confidence that the first merchant data corresponds to a second merchant, the second merchant being associated with second merchant data stored in the merchant data structure; determine, based on the measure of confidence, that the first merchant corresponds to the second merchant; obtain, based on the first merchant being determined to correspond to the second merchant, the second merchant data from the merchant data structure; and perform an action based on the second merchant data.

According to some implementations, a non-transitory computer-readable medium may store instructions, the instructions including one or more instructions that, when executed by one or more processors, cause the one or more processors to: obtain training data, the training data including: first merchant data specifying, for each first merchant included in a set of first merchants, one or more characteristics associated with the first merchant, the first merchant data being from a first source; second merchant data specifying, for each second merchant included in a set of second merchants, one or more characteristics associated with the second merchant, the second merchant data being from a second source that is different from the first source; and data indicating matches between first merchants included in the set of first merchants and second merchants included in the set of second merchants; and generate a merchant matching model based on the training data, the merchant matching model being trained to: receive one or more input characteristics associated with a particular merchant; determine, for each input characteristic of the one or more input characteristics, a first measure of confidence that the input characteristic indicates a match between the particular merchant and at least one other merchant, the at least one other merchant being included in the set of first merchants or the set of second merchants; and produce an output indicating, for the at least one other merchant, a measure of confidence that the particular merchant matches the at least one other merchant.

According to some implementations, a method may include receiving, by a device, a merchant query including first merchant data associated with a first merchant; providing, by the device, the first merchant data as input to a merchant matching model associated with a merchant data structure, the merchant matching model having been trained, using machine learning, to determine a measure of confidence that input merchant data corresponds to an existing merchant in the merchant data structure; receiving, by the device and as output from the merchant matching model, a measure of confidence that the first merchant data corresponds to a second merchant, the second merchant being associated with second merchant data stored in the merchant data structure; determining, based on the measure of confidence, that the first merchant corresponds to the second merchant; and performing an action based on a result of the determination that the first merchant corresponds to the second merchant.

DETAILED DESCRIPTION

Figure 1:
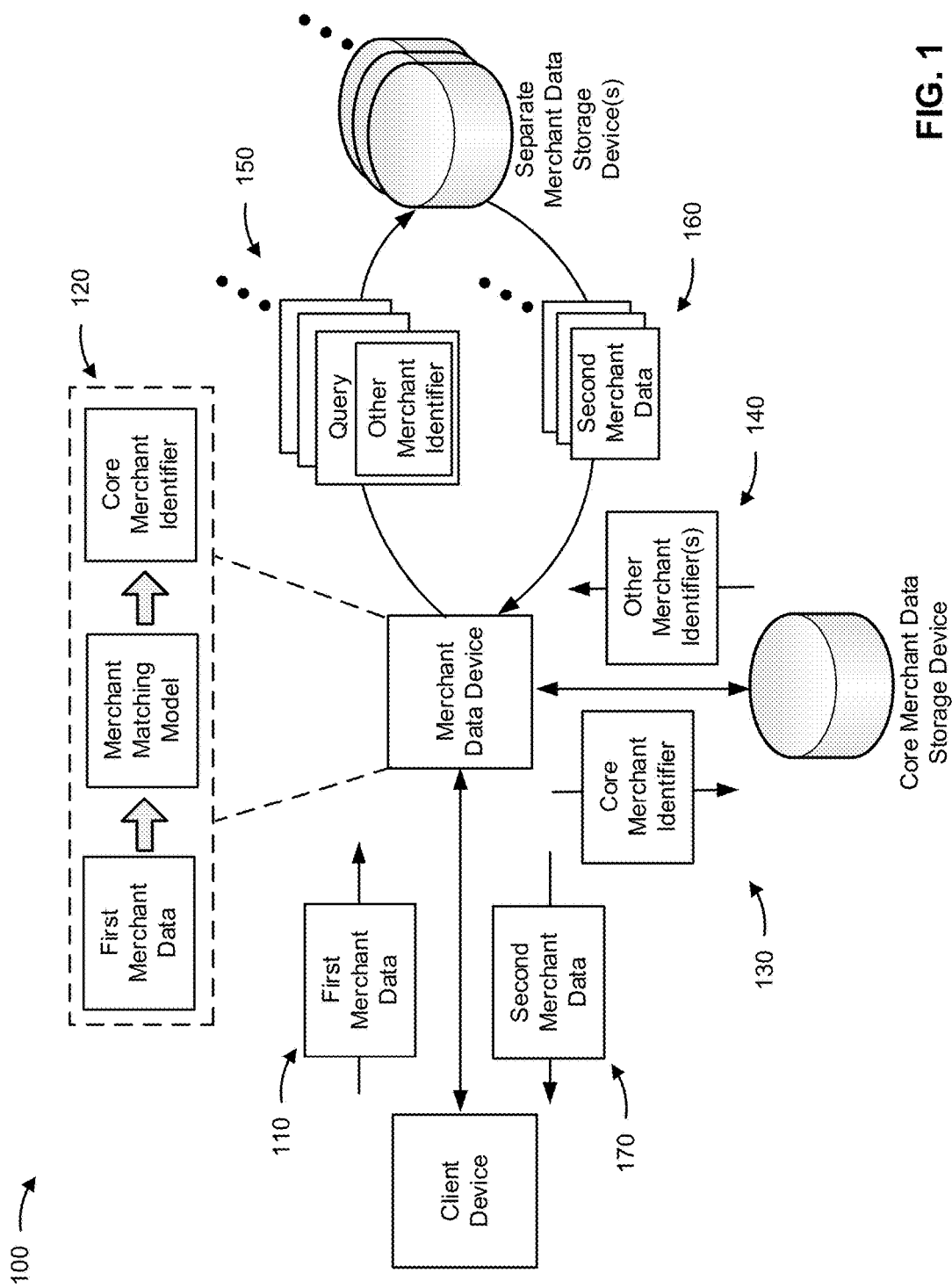
FIG. 1 is a diagram of an overview of an example implementation described herein.

The following detailed description of example implementations refers to the accompanying drawings. The same reference numbers in different drawings may identify the same or similar elements.

Merchant data for a particular merchant (e.g., a provider of goods and/or services) may exist in many forms and in many different data structures that are managed by many different organizations. For example, data associated with a particular merchant may be included in many different databases, and the manner in which the merchant data is stored and/or indexed for the particular merchant may vary from one database to another. For example, different databases may store different types of merchant data, and some databases may use different database structures, including different hardware and/or software to manage merchant data. In addition, the merchant data included in different data structures may also vary. For example, merchants may be identified differently in different databases, merchant data may be stored in different formats, and/or incorrect or incomplete merchant data may be stored in some databases. When an entity wishes to obtain particular merchant data for a particular merchant, it may be difficult to identify which data structure includes the particular merchant data and difficult to determine how to obtain the particular merchant data from the data structure.

Some implementations, described here, provide a merchant data device that is capable of determining, for a particular merchant, a unique merchant identifier. Using the unique merchant identifier, the merchant data device may access, for the particular merchant, a variety of merchant data stored in multiple different data structures. For example, the merchant data device may have access to multiple databases storing a variety of information for a variety of merchants. Using machine learning, the merchant data device may generate a merchant matching model designed to receive, as input, data identifying a particular merchant and produce, as output, a measure of confidence that the particular merchant matches a second merchant associated with a core merchant identifier (e.g., an identifier that uniquely identifies the second merchant). Based on the output of the merchant matching model, the merchant data device may determine that the particular merchant is the second merchant (e.g., identified by the core merchant identifier).

In some implementations, the merchant data device may include a data structure, such as a mapping table, designed to map each core merchant identifier to a set of separate merchant identifiers that each corresponds to a separate merchant data structure. Using the mapping, and data specifying the merchant data included in each of the separate merchant data structures, the merchant data device may obtain, for the particular merchant, any merchant data that is stored in any of the separate merchant data structures, enabling an entity requesting information regarding the particular merchant to obtain a large variety of merchant data from a variety of different sources.

The ability to identify a core merchant identifier from data associated with a particular merchant, and the ability to use the core merchant identifier to access merchant data across multiple different data sources, may facilitate a variety of operations related to merchant identification, merchant analytics, merchant research, or the like. In addition, the aforementioned features may facilitate conservation of computational resources for devices that interact with the merchant data device, including the underlying merchant data storage devices. For example, the merchant data device may significantly reduce the time and resources used by client devices that query for merchant data, e.g., by enabling relatively quick merchant identification and/or information retrieval, obviating the need to use hardware resources for searching for merchant data multiple times, refining results, and repeating searches across multiple databases. Reducing queries may increase the operating speed and efficiency of the underlying merchant data sources as well, e.g., by reducing the number of queries the merchant data sources might otherwise be handling, and may also conserve network resources as well. Further details regarding potential time and resource savings are described in the paragraphs that follow.

FIG. 1 is a diagram of an overview of an example implementation 100 described herein. As shown in FIG. 1, example implementation 100 may include a client device, a merchant data device, a core merchant data storage device, and one or more separate merchant data storage device(s).

As shown in FIG. 1, and by reference number 110, the client device (e.g., a personal computer, server computer, or the like) provides the merchant data device with first merchant data 110. The first merchant data may include, for example, any data associated with a particular merchant, such as a name, phone number, address, universal resource locator (URL), or the like. By way of example, the client device may be operated by a user that wishes to know more information about a particular merchant, but the user only has an email address associated with the particular merchant. In this situation, the client device provides the email address to the merchant data device, e.g., with the intent to receive more information regarding the particular merchant.

As further shown in FIG. 1, and by reference number 120, the merchant data device provides the first merchant data to a merchant matching model and, using the output of the merchant matching model, identifies a core merchant identifier (e.g., an identifier that uniquely identifies a merchant). For example, the merchant matching model may be a machine learning based model that identifies, using the first merchant data, one or more potentially matching merchants that might match the particular merchant associated with the first merchant data and, for each of the one or more potentially matching merchants, a measure of confidence that the particular merchant matches the potentially matching merchant. Given a high enough measure of confidence (e.g., a measure of confidence that satisfies a threshold), the merchant data device may determine that there is a match, e.g., indicating that the particular merchant associated with the first merchant data matches a second merchant from the potentially matching merchants (e.g., the second merchant being the potentially matching merchant with the highest measure of confidence output from the merchant matching model).

The core merchant identifier is an identifier that uniquely identifies the second merchant which, based on the match, also identifies the particular merchant. Using the example situation above, the merchant data device may provide the email address (e.g., the email address included in the first merchant data associated with the particular merchant) as input to the merchant matching model and determine, from the output of the merchant matching model, a core merchant identifier for the particular merchant. The core merchant identifier may indicate, for example, that the particular merchant associated with the email address is a particular coffee shop.

As further shown in FIG. 1, and by reference number 130, the merchant data device provides the core merchant identifier to the core merchant data storage device. In some implementations, the core merchant data storage device may be a database or another data structure that stores a mapping between the core merchant identifier and multiple other merchant identifiers. In this situation, the merchant data device may query the core merchant data storage device using the core merchant identifier, e.g., in a manner designed to obtain other merchant identifiers associated with the core merchant identifier. Using the example above, the core merchant identifier that identifies the particular coffee shop may be provided in a query to the core merchant data storage device in a manner designed to obtain other merchant identifiers for that particular coffee shop.

As further shown in FIG. 1, and by reference number 140, the merchant data device obtains other merchant identifiers from the core merchant data storage device. In some implementations, the merchant data device may receive the other merchant identifiers in response to a query sent to the core merchant data storage device, e.g., the query including the core merchant identifier. Each other merchant identifier may include data identifying the merchant identified by the core merchant identifier. For example, each other merchant identifier may be associated with a separate merchant data storage device (e.g., separate from the core merchant data storage device and each other merchant data storage device). Using the coffee shop example above, the other merchant identifiers may identify the particular coffee shop in other merchant data databases, e.g., merchant data databases that may store information regarding the particular coffee shop.

As further shown in FIG. 1, and by reference number 150, the merchant data device sends queries to separate merchant data storage devices. Each query includes one of the other merchant identifiers, and each query is addressed to the separate merchant data storage device associated with the other merchant identifier. Providing the separate merchant data storage devices with the other merchant identifiers may enable the separate merchant data storage devices to identify information regarding the particular merchant. Using the coffee shop example, the merchant data device may provide the three separate queries to three separate merchant data databases that each store merchant data regarding the particular coffee shop, but the merchant data in the separate merchant databases is associated with one of the other merchant identifiers (e.g., not the core merchant identifier or the first merchant data).

As further shown in FIG. 1, and by reference number 160, the merchant data device receives, from the separate merchant data storage devices, second merchant data. The second merchant data may include a variety of information associated with the particular merchant (e.g., the merchant identified by the core merchant identifier). Using the coffee shop example, the second merchant data may include, for the particular coffee shop, an address, phone number, website, menu, user reviews, business hours, news articles, sales data, or the like.

As further shown in FIG. 1, and by reference number 170, the merchant data device provides second merchant data to the client device. The second merchant data provided to the client device may be the same as or different from the second merchant data provided to the merchant data device. In some implementations, the merchant data device may curate the second merchant data (e.g., to remove duplicate information or information not relevant to the client device in situations where the client device requested specific merchant data). Additionally, or alternatively, the second merchant data may include the core merchant identifier, e.g., providing the client device with a unique identifier for the particular merchant. In this way, merchant data device may identify and provide merchant data associated with multiple data structures.

As indicated above, FIG. 1 is provided merely as an example. Other examples are possible and may differ from what was described with regard to FIG. 1. In some implementations, the merchant data device may be capable of receiving and processing first merchant data from many client devices at many different times. In this situation, merchant data device may identify merchant data associated with hundreds, thousands, millions, billions, or more merchants, enabling merchant data device to provide second merchant data for hundreds, thousands, millions, billions, or more client devices—data that cannot be processed, at least not processed objectively, by a human operator.

Figure 2:
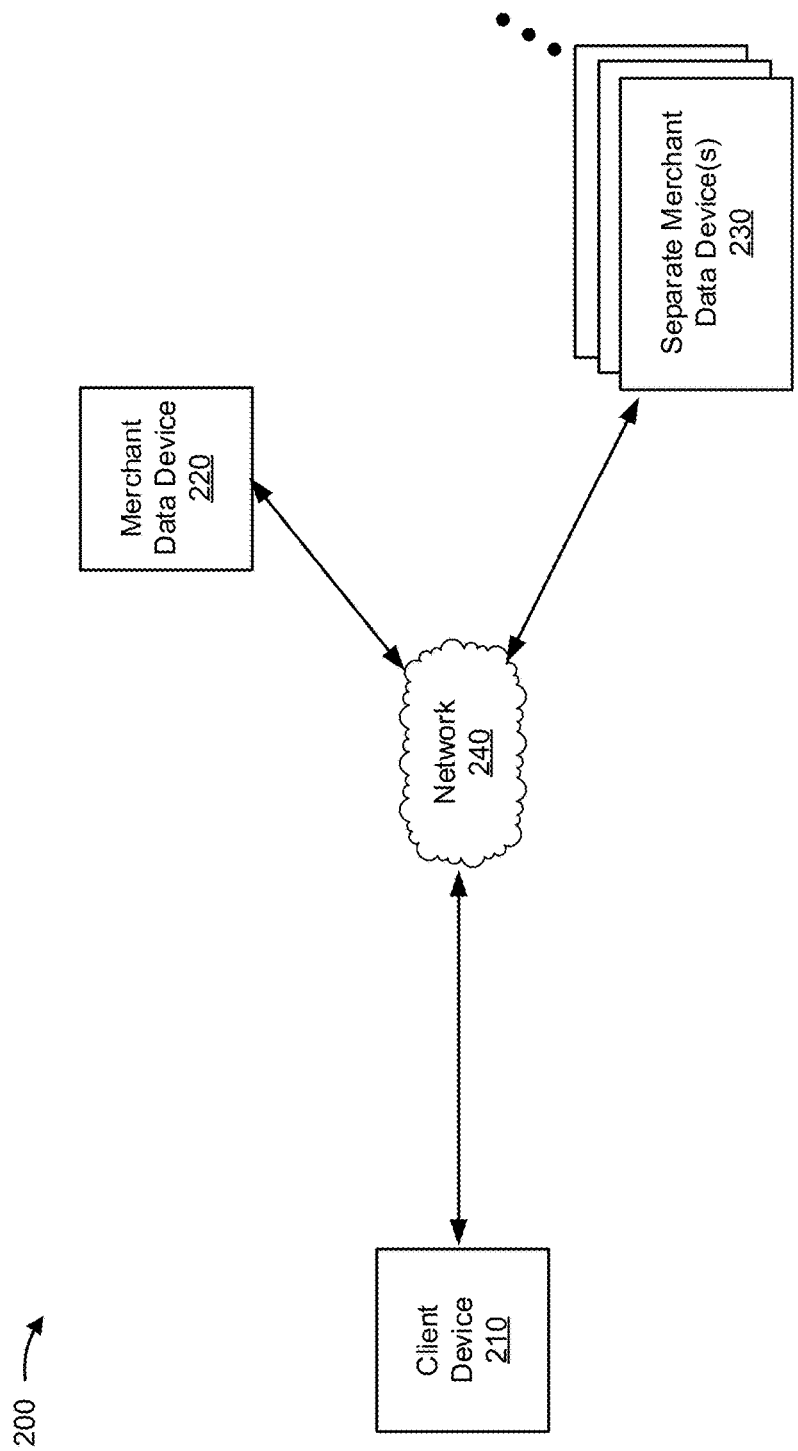
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a merchant data device 220, separate merchant data device(s) 230, and network 240. Devices of environment 200 may interconnect via wired connections, wireless connections, or a combination of wired and wireless connections.

Client device 210 includes one or more devices capable of receiving, generating, storing, processing, and/or providing information associated with merchants and merchant data. For example, client device 210 may include a communication and/or computing device, such as a mobile phone (e.g., a smart phone, a radiotelephone, etc.), a laptop computer, a tablet computer, a handheld computer, a server device, a gaming device, a wearable communication device (e.g., a smart wristwatch, a pair of smart eyeglasses, etc.), or a similar type of device. Client device 210 may include one or more applications designed to facilitate communications between client device 210 and merchant data device 220, such as a web browser application.

Merchant data device 220 includes one or more devices capable of receiving, generating, storing, processing, and/or providing information associated with merchant data. For example, merchant data device 220 may include a computing device, such as a server computer, personal computer, mobile phone, laptop computer, tablet computer, or a similar type of device. In some implementations, merchant data device 220 may include a web server that provides a website enabling a user of client device 210 to provide merchant data (e.g., in a query), using the website. In some implementations, merchant data device 220 may be implemented by a group of server devices of a cloud computing environment or a data center. For example, some or all of the functions of merchant data device 220 may be performed by one or more virtual machines implemented on one or more server devices in a cloud computing environment or a data center. Merchant data device 220 may, in some implementations, have access to local and/or remote storage (e.g., core merchant data storage device) for merchant data, merchant identifiers, and/or a mapping of merchant identifiers used to identify merchant data associated with multiple data structures.

Separate merchant data device(s) 230 includes one or more devices capable of receiving, generating, storing, processing, and/or providing information associated with merchant data. For example, a separate merchant data device 230 may include a communication and/or computing device, such as a server computer, personal computer, mobile phone, laptop computer, tablet computer, or a similar type of device. Separate merchant data device 230 may include and/or be in communication with a data structure used to store merchant data, such as a merchant data database. In some implementations, each separate merchant data device 230 may use a different method for storing merchant data, e.g., different type of data structure, different type of indexing, different formats, different merchant identifiers, or the like.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
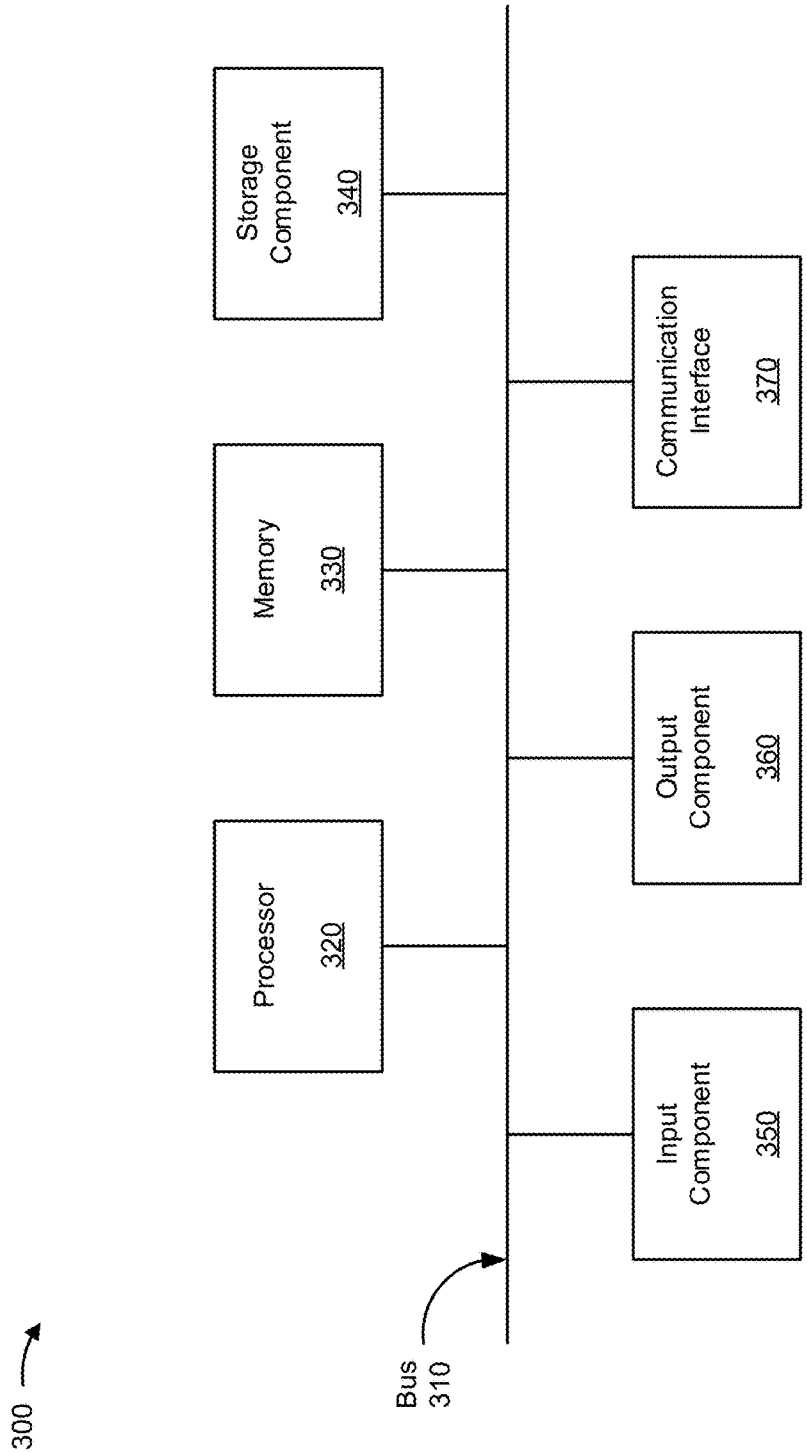
FIG. 3 is a diagram of example components of one or more devices of FIG. 2.

FIG. 3 is a diagram of example components of a device 300. Device 300 may correspond to client device 210, merchant data device 220, and/or separate merchant data device 230. In some implementations, client device 210, merchant data device 220, and/or separate merchant data device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
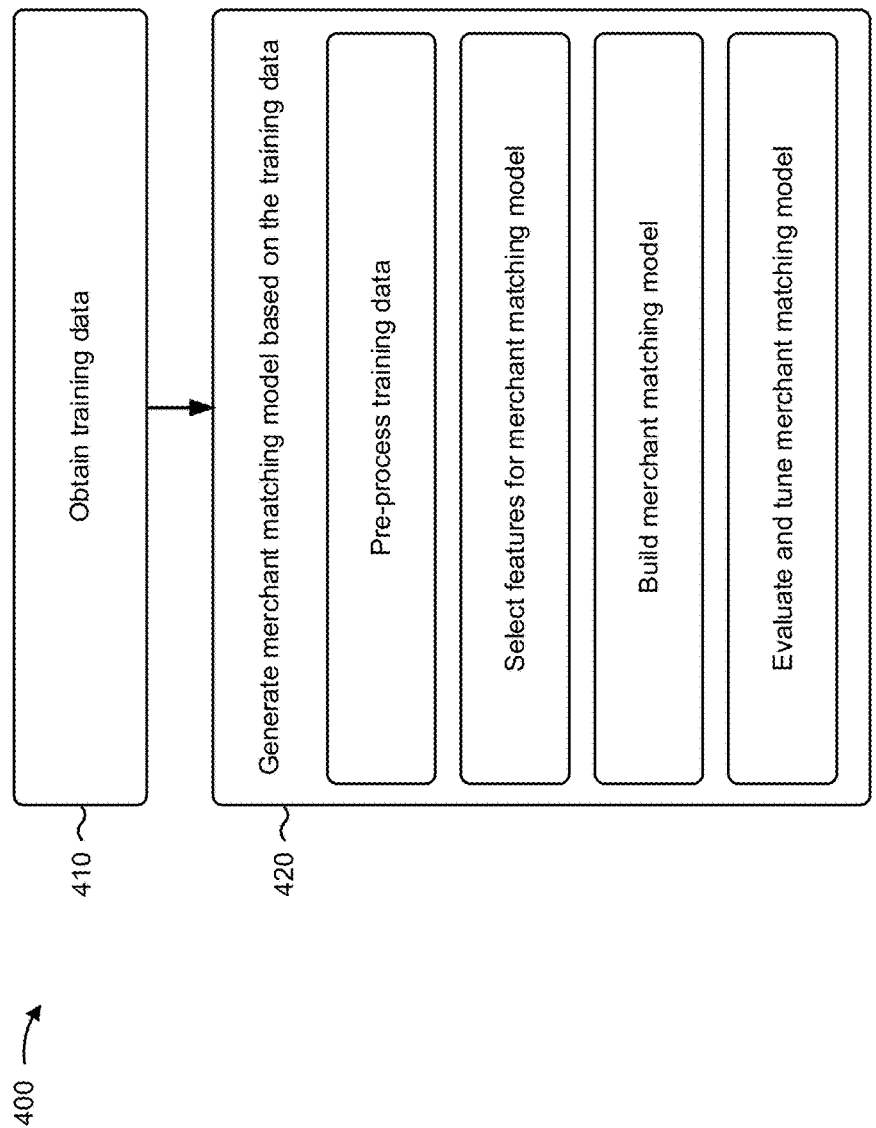
FIG. 4 is a flow chart of an example process for generating a model for identifying merchant data associated with multiple data structures.

FIG. 4 is a flow chart of an example process 400 for generating a model for identifying merchant data associated with multiple data structures. In some implementations, one or more process blocks of FIG. 4 may be performed by merchant data device 220. In some implementations, one or more process blocks of FIG. 4 may be performed by another device or a group of devices separate from or including merchant data device 220, such as client device 210 and/or separate merchant data device 230.

As shown in FIG. 4, process 400 may include obtaining training data (block 410). For example, merchant data device 220 may obtain training data. The training data may include a variety of data that may be used to train a merchant matching model (e.g., a multi-class classifier). For example, the training data may include first merchant data from a first source. The first merchant data may specify, for each merchant included in a set of first merchants, one or more characteristics associated with the first merchant. By way of example, characteristics may include a string provided by the first merchant; a name of the first merchant; an address of the first merchant; a phone number of the first merchant; a fax number of the first merchant; a resource locator of the first merchant; an electronic mail address of the first merchant; a category for the first merchant; a description of the first merchant; business hours of the first merchant; transaction identifiers for the first merchant; and/or geographic coordinates of the first merchant. The foregoing characteristics are merely examples, and any other characteristics associated with the first merchant could be included additionally, or alternatively, in the first merchant data.

In some implementations, training data may also include one or more characteristics associated with other merchant data form other sources. For example, the training data may include second merchant data from a second source that is separate from the first source. The second merchant data may specify, for each merchant included in a set of second merchants, one or more characteristics associated with the second merchant. The characteristics associated with the second merchant may be the same as or different from the characteristics associated with the first merchant. Some characteristics may overlap, while other characteristics may only be included in either the first merchant data or second merchant data. In some implementations, the first merchant data may differ from the second merchant data in other ways, e.g., stored in different type of data structure, stored using a different type of indexing, stored in different formats, associated with different merchant identifiers, or the like.

The training data may also include data indicating matches between first merchants included in the set of first merchants and second merchants included in the set of second merchants. For example, in a situation using supervised machine learning, a user may have previously identified which merchants match (e.g., a user may have identified matches between first merchants and second merchants).

By way of example, merchant data device 220 may obtain training data that includes core merchant identifiers from a merchant data structure (e.g., the core merchant identifiers being the first merchant data, and the merchant data structure being the first source). In some implementations, the training data may include other data stored in the merchant data structure (e.g., data stored in core profiles associated with the core merchant identifiers, which may specify merchant data such as merchant name, merchant address, merchant telephone number, or the like). In implementations where data from multiple sources is included in the training data, the training data may include second merchant data obtained from a separate data structure (e.g., the separate data structure being the second source).

In some implementations, merchant data device 220 may obtain training data associated with hundreds, thousands, millions, billions, or more merchants, enabling merchant data device 220 to process training data for hundreds, thousands, millions, billions, or more data sets. In this way, merchant data device 220 may obtain training data, which may enable merchant data device 220 to perform various machine learning techniques to generate a merchant matching model.

As further shown in FIG. 4, process 400 may include generating a merchant matching model based on the training data (block 420). For example, merchant data device 220 may generate a merchant matching model based on the training data. The merchant matching model may be trained in a variety of ways, and may be trained to receive one or more input characteristics associated with a particular merchant. The merchant matching model may provide, as output based on the input characteristics, a measure of confidence that the input characteristics indicate a match between the particular merchant and another merchant.

In some implementations the merchant matching model may be generated using supervised machine learning. In this situation, supervised machine learning may include, by way of example, a pre-processing phase, a feature selection and normalization phase, a model building phase, and a model evaluation and tuning phase.

In the pre-processing phase, merchant data device 220 may extract features and/or identify key words associated with a set of merchant data (e.g., included in the training data). For example, the characteristics included in a set of merchant data may identify merchant name, address, and phone number, description, website, or the like as potential machine learning features, and the merchant data may be extracted and formatted in a standard way (e.g., in a manner designed to ensure the format of each feature is suitable for processing and in a manner than enables comparison). For example, merchant data device 220 may pre-process data in a manner designed to remove white space, extra characters, or portions of data that may not be likely to match, or that may be of little value for merchant mapping. By way of example, punctuation marks for an address, parentheticals and/or hyphens for a phone number, or the like, may be removed, as some data sources may make use of them while others may not. In some implementations, natural language processing techniques may be used to pre-process training data, e.g., in a manner designed to enable certain characteristics, such as merchant categories, merchant descriptions, and/or merchant reviews, to be compared.

In the feature selection phase, merchant data device 220 determines which characteristics, or features, are to be used to train the merchant matching model, and normalizes the features. The features to be used may be selected manually (e.g., by an administrator of merchant data device 220), automatically (e.g., by analyzing features and/or repeating the model training process multiple times with different feature sets to determine the set of features to be used), or a combination of manual and automatic feature selection. For example, merchant data device 220 may use merchant name, address, and phone number as the characteristics, or features, to be used to generate the merchant matching model. The features may be normalized, or transformed, in a manner designed to enable the features to be matched and compared with training data features (e.g., in a manner designed to enable merchant data device 220 to assign more weight to a similar merchant name than weight given to a similar merchant phone number).

In the model building phase, merchant data device 220 may determine coefficients for the merchant matching model and separate the training data into a training set and a test set (e.g., the training set to be used to calculate initial feature coefficients, and the test set to test the merchant matching model and fine tune the coefficients).

In the model evaluation and tuning phase, merchant data device 220 may use the merchant matching model to predict results for the test set of the training data. The results may be evaluated to determine how well the merchant matching model performs and to tune the merchant matching model based on the results. For example, merchant data device 220 may use a variety of supervised machine learning algorithms, such as linear regression, logistic regression, naïve Bayes regression, support vector machines, or the like.

In some implementations, other machine learning and data processing techniques may be used when generating the merchant matching model. For example, in situations where images or video may be compared and/or matched, merchant data device 220 may perform computer vision techniques (such as optical character recognition or the like) to obtain and process training data. As another example, in situations where audio may be compared and/or matched, merchant data device may perform audio processing techniques (e.g., audio transcription techniques or the like). As noted above, merchant data device 220 may also use natural language processing techniques in a manner designed to enable merchant data device 220 to compare and/or match text in different forms, languages, formats, or the like.

As noted above, the merchant matching model generated by merchant data device 220 may be used to identify one or more merchant identifiers that may be associated with first merchant data provided, as input, to the merchant matching model. The merchant identifier, or merchant identifiers, included in the output of the merchant matching model may be associated with a measure of confidence that indicates a measure of likelihood (e.g., on scale of 0 to 1, on a scale of 0 to 100, etc.) that the merchant matching model correctly identified the input merchant data as being associated with the output merchant identifier. While the foregoing example describes one method for generating a merchant matching model using machine learning, many other machine learning methods may be used to generate the merchant matching model.

In this way, merchant data device 220 may generate the merchant matching model based on the training data, enabling merchant data device 220, or another device, to use the merchant matching model to determine a merchant identifier that may be used to identify merchant data associated with multiple data structures. In addition, while the blocks of FIG. 4 are described as being performed by merchant data device 220, the blocks may be performed, in whole or in part, by a different device that generates the merchant matching model for use by merchant data device 220.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
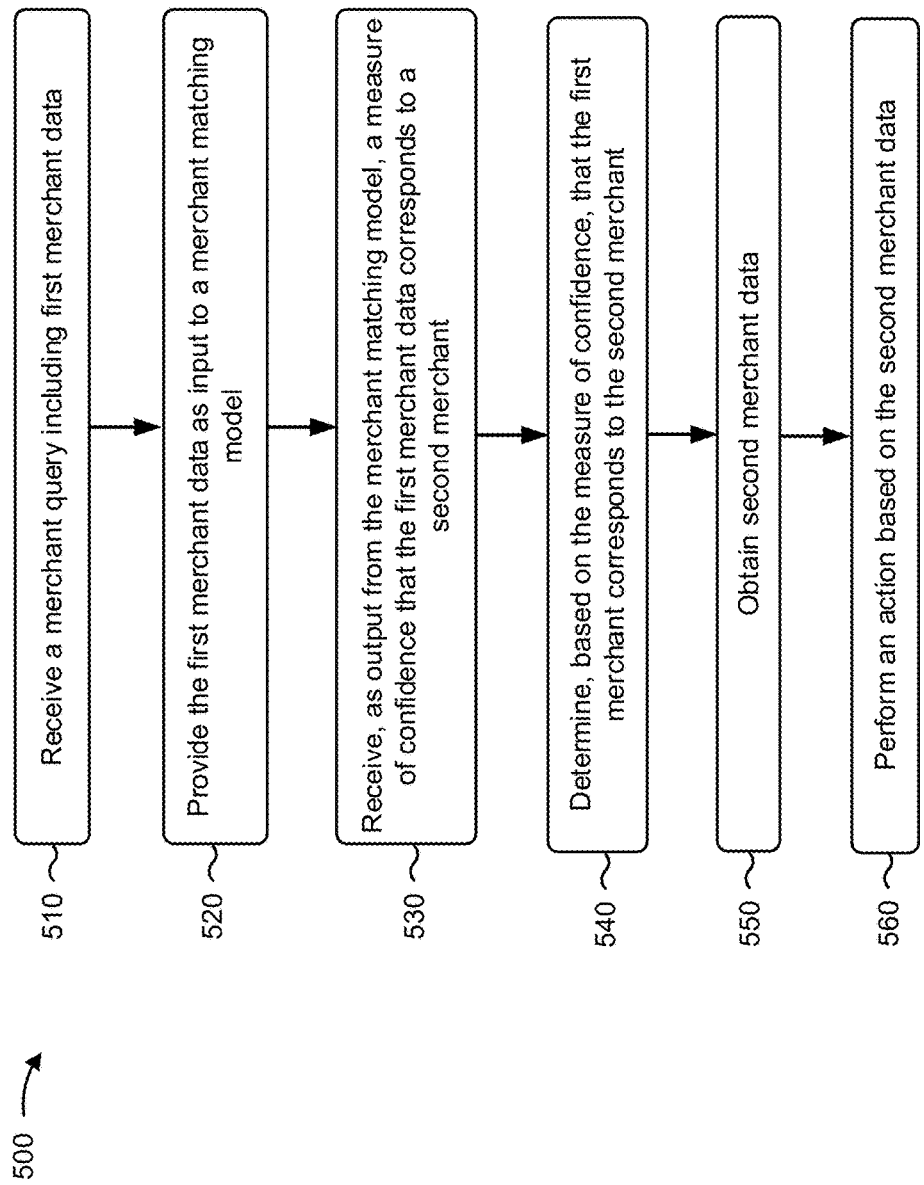
FIG. 5 is a flow chart of an example process for identifying merchant data associated with multiple data structures.

FIG. 5 is a flow chart of an example process 500 for identifying merchant data associated with multiple data structures. In some implementations, one or more process blocks of FIG. 5 may be performed by merchant data device 220. In some implementations, one or more process blocks of FIG. 5 may be performed by another device or a group of devices separate from or including merchant data device 220, such as client device 210 and/or separate merchant data device 230.

As shown in FIG. 5, process 500 may include receiving a merchant query including first merchant data (block 510). For example, merchant data device 220 may receive a merchant query that includes first merchant data that is associated with a first merchant. The merchant query may have been sent, for example, by client device 210, e.g., in a manner designed to obtain information regarding the first merchant. The first merchant data may include a variety of information associated with the first merchant, such as a string provided by the first merchant (e.g., a string that corresponds to a transaction, such as a transaction identifier), a name of the first merchant, an address of the first merchant, a phone number of the first merchant, a fax number of the first merchant, a resource locator of the first merchant (e.g., a website URL, web page URL, or the like), an electronic mail address of the first merchant, a category for of the first merchant, a description of the first merchant, business hours of the first merchant, or geographic coordinates of the first merchant. The foregoing examples are merely examples, and the first merchant data may include one or more of the foregoing, or a different type of merchant data.

In this way, merchant data device 220 may receive the merchant query, which includes first merchant data associated with the first merchant, enabling merchant data device 220 to use the first merchant data to determine whether the first merchant matches a second merchant.

As further shown in FIG. 5, process 500 may include providing the first merchant data as input to a merchant matching model (block 520). For example, merchant data device 220 may provide the first merchant data as input to a merchant matching model associated with a merchant data structure. The merchant matching model may be, for example, the same as or similar to the merchant matching model described above with reference to FIG. 4. The merchant matching model may be associated with the merchant data structure, for example, in that the merchant matching model was trained to produce output that includes a measure of confidence that the first merchant data provided as input to the merchant matching model corresponds to an existing merchant in the merchant data structure.

In some implementations, the merchant data device 220 may implement the merchant matching model (e.g., the merchant matching model input is to be processed by the merchant data device 220). In some implementations, the merchant matching model may be implemented by a separate device (e.g., a device that is separate from the merchant data device 220). In this situation, providing the first merchant data as input to the merchant matching model may include providing the first merchant data to the separate device.

In this way, merchant data device 220 may provide the first merchant data as input to the merchant matching model, enabling the merchant matching model to determine a measure of confidence that the input merchant data corresponds to an existing merchant in the merchant data structure.

As further shown in FIG. 5, process 500 may include receiving, as output from the merchant matching model, a measure of confidence that the first merchant data corresponds to a second merchant (block 530). For example, merchant data device 220 may receive, from the merchant matching model, a measure of confidence that the first merchant data corresponds to a second merchant. The second merchant may be a merchant for which merchant data device 220 stores merchant data, including, for example, a core merchant identifier that uniquely identifies the second merchant. The measure of confidence may be represented in a variety of ways, such as data indicating a binary match or non-match, a score on a scale from 0 to 1, or the like.

In some implementations, merchant data device 220 may receive multiple measures of confidence, each associated with a corresponding merchant. For example, in some situations, the merchant matching model may identify multiple merchants that could be a match for the first merchant based on the first merchant data. In this situation, the merchants identified by the merchant matching model may be ranked, e.g., based on the corresponding confidence scores. In some implementations, the merchant matching model may provide merchant data device 220 with only measures of confidence (and data identifying the corresponding merchants) that satisfy a threshold measure of confidence.

In this way, merchant data device 220 may receive, as output from the merchant matching model, the measure of confidence that the first merchant data corresponds to the second merchant, enabling merchant data device 220 to determine whether the first merchant matches the second merchant.

As further shown in FIG. 5, process 500 may include determining, based on the measure of confidence, that the first merchant corresponds to the second merchant (block 540). For example, merchant data device 220 may determine, based on the measure of confidence, that the first merchant matches the second merchant. In some implementations, the determination may be made using a threshold measure of confidence. For example, using a scale of 0 to 1 and a threshold of 0.8, merchant data device 220 may determine that the first merchant matches the second merchant in a situation where the measure of confidence is greater than or equal to the threshold of 0.8. In implementations where the measure of confidence is binary (e.g., either the first merchant is considered, by the merchant matching model, to match the second merchant, or not), merchant data device 220 may use the binary decisions of the merchant matching model to determine whether the first merchant matches the second merchant.

In some implementations, merchant data device 220 may receive multiple measures of confidence and determine which corresponding merchant matches the first merchant, if any. In this situation, merchant data device 220 may use a variety of methods for determining that the first merchant matches the second merchant. For example, merchant data device 220 may determine that the merchant associated with the highest measure of confidence is a match for the first merchant. In some implementations, merchant data device 220 may only determine the merchant associated with the highest measure of confidence is a match if the highest measure of confidence is greater than the next highest measure of confidence by a threshold amount. In this situation, and using an example threshold of 0.25, merchant data device 220 may determine that a merchant associated with a confidence score of 0.8 is only considered a match to the first merchant if the next-highest measure of confidence associated with a different merchant is less than 0.55 (e.g., 0.25 less than the highest measure of confidence). As in situations with a single measure of confidence and corresponding second merchant, in situations with multiple measures of confidence associated with multiple merchants, a minimum confidence threshold may be used (e.g., in addition to any other thresholds or methods of selecting among multiple merchants).

In some implementations, merchant data device 220 may determine that multiple merchants match the first merchant. For example, some merchants may be related to one another (e.g., a parent entity and subsidiary entity, an entity's online merchant presence and retail presence, or the like). In this situation, merchant data device 220 may determine that multiple merchants match the first merchant.

In some implementations, merchant data device 220 may determine, based on the measure of confidence, that the first merchant does not match any other merchant. In this situation, merchant data device 220 may perform a variety of actions, including requesting additional merchant data associated with the first merchant, requesting clarification regarding the first merchant data, providing client device 210 with a best guess, or multiple results, based on the output of the merchant matching model, and/or ending process 500.

In some implementations, merchant data device 220 may provide client device 210 with feedback data enabling client device 210 to provide additional input to be used to determine whether the first merchant corresponds to the second merchant. For example, merchant data device 220 may provide client device 210 with data that causes client device 210 to prompt a user of client device 210 for a determination regarding whether the user believes the first merchant matches the second merchant. In this situation, merchant data device 220 may use the response of the user of client device 210 to determine whether the first merchant matches the second merchant.

In this way, merchant data device 220 may determine that the first merchant corresponds to, or matches, the second merchant, enabling merchant data device to obtain second merchant data regarding the second merchant.

As further shown in FIG. 5, process 500 may include obtaining second merchant data (block 550). For example, merchant data device 220 may obtain second merchant data from the merchant data structure. In some implementations, the merchant data structure may include, for the second merchant, a core profile that includes a variety of merchant data associated with the second merchant, including a core merchant identifier that uniquely identifies the second merchant. Other second merchant data may include, for example: a name of the second merchant; an address of the second merchant; a phone number of the second merchant; a fax number of the second merchant; a resource locator of the second merchant; an electronic mail address of the second merchant; a category for of the second merchant; a description of the second merchant; business hours of the second merchant; or geographic coordinates of the second merchant.

In some implementations, the second merchant data may include one or more separate merchant identifiers that are associated with separate merchant data devices 230. For example, the core profile for the second merchant may include data mapping the core merchant identifier to the separate merchant identifiers. The separate merchant identifiers may be used, for example, to obtain information regarding the second merchant from sources of data other than the merchant data structure, such as separate merchant data devices 230, which may be maintained by separate entities.

In this way, merchant data device 220 may obtain second merchant data from the merchant data structure, enabling merchant data device to perform an action based on the second merchant data.

As further shown in FIG. 5, process 500 may include performing an action based on the second merchant data (block 560). For example, merchant data device 220 may perform an action based on the second merchant data. Merchant data device 220 may be capable of performing a variety of actions, including providing second merchant data to client device 210, obtaining separate merchant data to be provided to client device, and/or associating the first merchant data with the second merchant, and/or causing the merchant matching model to be updated based on feedback provided by a user (e.g., feedback indicating whether the first merchant matched the second merchant, whether the second merchant data was relevant, or the like).

For example, merchant data device 220 may provide client device 210 with data included in the core profile of the second merchant (e.g., data stored in the merchant data structure), such as the core merchant identifier of the second merchant, one or more of the separate merchant identifiers, the second merchant name, the second merchant address, and/or the like. Second merchant data provided to client device 210 may be based on the merchant query, which may have included data indicating which merchant data client device 210 was seeking.

In some implementations, merchant data device 220 may provide separate merchant data device 230 with a query for separate merchant data associated with the second merchant. The query may include the separate merchant identifier that corresponds to the separate merchant data device 230, e.g., in a manner designed to enable the separate merchant data device 230 to process the query using a merchant identifier familiar to the separate merchant data device 230. Merchant data device 220 may receive, from separate merchant data device 230, separate merchant data (e.g., data that might not be included in the merchant data structure). In this situation, merchant data device 220 may provide client device 210 with separate merchant data regarding the second merchant, instead of or in addition to second merchant data included in the merchant data structure. This may enable client device 210 to have access to information regarding the second merchant that client device 210 may not have otherwise had knowledge of or access to.

In some implementations, merchant data device 220 may obtain second merchant data from separate merchant data devices 230 (e.g., in the manner described above) and format or standardize the second merchant data. For example, merchant data device 220 may modify second merchant data received from separate merchant data devices 230 to be presented to client device in a particular manner. Modifications may include, for example, translating the second merchant data into another language, formatting text and/or images in a particular way, converting audio to text, or the like.

In some implementations, merchant data device 220 may provide any number of separate merchant data devices 230 with queries for a variety of separate merchant data. In some implementations, merchant data device 220 may provide one or more separate merchant data devices 230 with a query for particular information regarding the second merchant. For example, the merchant query provided by client device 210 may have specified particular information sought by the user of client device 210. In this situation, merchant data device 220 may query separate merchant data devices 230 for the particular information. In some implementations, merchant data device 220 may have access to data identifying the types of merchant data stored by separate merchant data devices 230, enabling merchant data device 220 to direct queries for particular merchant data to the appropriate separate merchant data device 230.

In some implementations, merchant data device 220 may associate the first merchant data with the second merchant. For example, the first merchant data may include merchant data that has not previously been associated with the second merchant. In this situation, merchant data device 220 may associate the first merchant data with the second merchant (e.g., by storing the first merchant data in the core profile associated with the second merchant and/or providing the first merchant data to one or more separate merchant data devices 230 for storage by separate entities).

Other actions, in addition to and/or separate from the actions described above, may be performed by merchant data device 220 based on the second merchant data. In this way, merchant data device 220 may perform an action based on the second merchant data.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As noted above, the ability to identify a unique merchant identifier from data associated with a particular merchant, and the ability to use the unique merchant identifier to access merchant data across multiple different data sources, may facilitate a variety of operations related to merchant identification, merchant analytics, merchant research, or the like. In addition, the aforementioned features may facilitate conservation of computational resources for devices that interact with the merchant data device, including the underlying merchant data structures. For example, the merchant data device may significantly reduce the time and resources used by client devices that query for merchant data, e.g., by enabling relatively quick merchant identification and/or information retrieval, obviating the need to use hardware resources searching for merchant data multiple times, refining results, and repeating searches across multiple databases. Reducing queries may increase the operating speed and efficiency of the devices acting on the underlying merchant data structures as well, e.g., by reducing the number of queries the merchant data device and/or separate merchant data devices might otherwise be handling.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. As used herein, the term "or the like" is intended to be inclusive (e.g., as in "and/or the like"), unless explicitly stated otherwise. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory; and
   one or more processors to:
      receive a first query including first merchant data associated with a first merchant;
      provide the first merchant data as input to a merchant matching model associated with a merchant data structure,
         the merchant matching model having been trained to determine a measure of confidence that input merchant data corresponds to an existing merchant in the merchant data structure;
      receive, as output from the merchant matching model, a particular measure of confidence that the first merchant data corresponds to a second merchant,
         the second merchant being associated with second merchant data stored in the merchant data structure;

determine, based on the particular measure of confidence, that the first merchant corresponds to the second merchant;
obtain, based on the first merchant being determined to correspond to the second merchant, the second merchant data from the merchant data structure,
a core profile, associated with the second merchant, being stored in the merchant data structure; and
perform a plurality of actions based on the second merchant data,
the plurality of actions including:
an association of the first merchant data with the second merchant,
an update of the merchant matching model based on feedback indicating that the first merchant corresponds to the second merchant,
a generation of a second query for third merchant data associated with the second merchant,
the second query including a merchant identifier corresponding to another device,
a receipt of the third merchant data, associated with the second merchant, based on providing the second query to the other device, and
an update of the core profile, associated with the second merchant, to include the first merchant data and the third merchant data.

2. The device of claim 1, where:
the second merchant data includes a core merchant identifier for the second merchant;
the core merchant identifier is mapped to the merchant identifier corresponding to the other device.

3. The device of claim 1, where the one or more processors, when performing the plurality of actions based on the second merchant data, are further to:
provide a core merchant identifier, for the second merchant, to a client device associated with the first query.

4. The device of claim 1, where:
the second merchant data is a core merchant identifier for the second merchant, and
the one or more processors, when performing the plurality of actions based on the second merchant data, are to:
query, using the core merchant identifier, a plurality of separate data structures for separate merchant data related to the second merchant;
receive, from the plurality of separate data structures, the separate merchant data from at least two of the plurality of separate data structures; and
provide the separate merchant data to a client device associated with the first query.

5. The device of claim 1, where:
the first query includes data requesting a particular merchant characteristic, and
the one or more processors, when performing the plurality of actions based on the second merchant data, are to:
identify, based on the particular merchant characteristic, a particular data structure that includes the particular merchant characteristic;
query, based on the second merchant data, the particular data structure for the particular merchant characteristic;
obtain, based on the query, the particular merchant characteristic; and
provide the particular merchant characteristic to a client device associated with the first query.

6. The device of claim 1, where the first merchant data includes at least one of:
a string provided by the first merchant;
a name of the first merchant;
an address of the first merchant;
a phone number of the first merchant;
a fax number of the first merchant;
a resource locator of the first merchant;
an electronic mail address of the first merchant;
a category for of the first merchant;
a description of the first merchant;
business hours of the first merchant; or
geographic coordinates of the first merchant.

7. A non-transitory computer-readable medium storing instructions, the instructions comprising:
one or more instructions that, when executed by one or more processors of a device, cause the one or more processors to:
obtain training data,
the training data including:
first merchant data specifying, for each first merchant included in a set of first merchants, one or more characteristics associated with the first merchant,
the first merchant data being from a first source;
second merchant data specifying, for each second merchant included in a set of second merchants, one or more characteristics associated with the second merchant,
the second merchant data being from a second source that is different from the first source; and
data indicating matches between first merchants included in the set of first merchants and second merchants included in the set of second merchants;
generate a merchant matching model based on the training data,
the merchant matching model being trained to:
receive one or more input characteristics associated with a particular merchant;
determine, for each input characteristic of the one or more input characteristics, a measure of confidence that the input characteristic indicates a match between the particular merchant and at least one other merchant,
the at least one other merchant being included in the set of first merchants or the set of second merchants; and
produce an output indicating, for the at least one other merchant, the measure of confidence that the particular merchant matches the at least one other merchant;
associate, based on the measure of confidence that the particular merchant matches the at least one other merchant, the particular merchant with the at least one other merchant;
cause the merchant matching model to be updated based on feedback indicating that the particular merchant matches the at least one other merchant;
generate a query for third merchant data associated with the at least one other merchant,
the query including a merchant identifier corresponding to another device;
receive the third merchant data, associated with the at least one other merchant, based on providing the query to the other device; and update a core profile, associated with the at least one other merchant, to include the third merchant data.

8. The non-transitory computer-readable medium of claim 7, where the one or more characteristics associated with the first merchant include one or more of:
- a string provided by the first merchant;
- a name of the first merchant;
- an address of the first merchant;
- a phone number of the first merchant;
- a fax number of the first merchant;
- a resource locator of the first merchant;
- an electronic mail address of the first merchant;
- a category for the first merchant;
- a description of the first merchant;
- business hours of the first merchant; or
- geographic coordinates of the first merchant.

9. The non-transitory computer-readable medium of claim 7, where the one or more instructions, when executed by the one or more processors, further cause the one or more processors to:
- receive, from a client device associated with the one or more input characteristics, a merchant query including the one or more input characteristics; and
- provide the one or more input characteristics as input to the merchant matching model.

10. The non-transitory computer-readable medium of claim 9, where the one or more instructions, when executed by the one or more processors, further cause the one or more processors to:
- provide, to the client device, data indicating the at least one other merchant and the measure of confidence.

11. The non-transitory computer-readable medium of claim 9, where the one or more instructions, when executed by the one or more processors, further cause the one or more processors to:
- determine, based on the measure of confidence, that the at least one other merchant matches the particular merchant;
- obtain, based on determining that the at least one other merchant matches the particular merchant, a particular merchant characteristic from a particular data structure; and
- provide, to the client device, the particular merchant characteristic.

12. The non-transitory computer-readable medium of claim 7, where the one or more instructions, when executed by the one or more processors, further cause the one or more processors to:
- receive, from a requesting device, a merchant query including one or more merchant characteristics associated with a third merchant;
- provide the one or more merchant characteristics as input to the merchant matching model; and
- receive, as output from the merchant matching model, data identifying a set of fourth merchants and, for each fourth merchant in the set of fourth merchants, another measure of confidence that the one or more merchant characteristics correspond to the fourth merchant.

13. The non-transitory computer-readable medium of claim 12, where the one or more instructions, when executed by the one or more processors, further cause the one or more processors to:
- provide, to the requesting device, data identifying the set of fourth merchants and, for each fourth merchant in the set of fourth merchants, the other measure of confidence that the one or more merchant characteristics correspond to the fourth merchant.

14. A method, comprising:
- receiving, by a device, a first query including first merchant data associated with a first merchant;
- providing, by the device, the first merchant data as input to a merchant matching model associated with a merchant data structure,
  - the merchant matching model having been trained, using machine learning, to determine a measure of confidence that input merchant data corresponds to an existing merchant in the merchant data structure;
- receiving, by the device and as output from the merchant matching model, a particular measure of confidence that the first merchant data corresponds to a second merchant,
  - the second merchant being associated with second merchant data stored in the merchant data structure, and
  - a core profile, associated with the second merchant, being stored in the merchant data structure;
- determining, based on the particular measure of confidence, that the first merchant corresponds to the second merchant; and
- performing a plurality of actions based on a result of the determination that the first merchant corresponds to the second merchant,
  - the plurality of actions including:
    - associating the first merchant data with the second merchant,
    - updating the merchant matching model based on feedback indicating the first merchant corresponds to the second merchant,
    - generating a second query for third merchant data associated with the second merchant,
      - the second query including a merchant identifier corresponding to another device,
    - receiving the third merchant data, associated with the second merchant, based on providing the second query to the other device, and
    - updating the core profile, associated with the second merchant, to include the first merchant data and the third merchant data.

15. The method of claim 14, further comprising:
- obtaining training data,
  - the training data including:
    - fourth merchant data specifying, for each first merchant included in a set of first merchants, one or more characteristics associated with the first merchant,
      - the first merchant data being from a first source; and
    - data indicating matches between first merchants included in the set of first merchants and a set of core merchant identifiers; and
- generating the merchant matching model based on the training data.

16. The method of claim 14, where performing the plurality of actions includes:
- obtaining, from the merchant data structure, a core merchant identifier associated with the second merchant; and
- providing the core merchant identifier to a client device associated with the first query.

17. The method of claim 16, further comprising:
- identifying the merchant identifier using a mapping table for the core merchant identifier,
  - the mapping table identifying a plurality of different identifiers for the second merchant, each of the plurality of different identifiers being associated with a different data structure storing information regarding the second merchant.

18. The device of claim 1, where the merchant matching model includes a multi-class classifier.

19. The device of claim 1, where the merchant matching model is generated using supervised machine learning.

20. The method of claim 16, where the core profile includes the core merchant identifier.

\* \* \* \* \*